(12) United States Patent
Kim

(10) Patent No.: US 11,810,352 B2
(45) Date of Patent: Nov. 7, 2023

(54) OPERATING METHOD OF SERVER FOR PROVIDING SPORTS VIDEO-BASED PLATFORM SERVICE

(71) Applicant: LITIV INC., Daejeon (KR)

(72) Inventor: Ji Hun Kim, Gunpo-si (KR)

(73) Assignee: LITIV INC., Daejeon (KR)

( * ) Notice: Subject to any disclaimer, the term of this patent is extended or adjusted under 35 U.S.C. 154(b) by 0 days.

(21) Appl. No.: 17/799,872

(22) PCT Filed: Jan. 30, 2021

(86) PCT No.: PCT/KR2021/001263
§ 371 (c)(1),
(2) Date: Aug. 15, 2022

(87) PCT Pub. No.: WO2021/162305
PCT Pub. Date: Aug. 19, 2021

(65) Prior Publication Data
US 2023/0072888 A1     Mar. 9, 2023

(30) Foreign Application Priority Data

Feb. 15, 2020   (KR) .......................... 10-2020-0018665
Mar. 14, 2020   (KR) .......................... 10-2020-0031651

(51) Int. Cl.
*G06V 20/40*      (2022.01)
*G06T 7/246*      (2017.01)
(Continued)

(52) U.S. Cl.
CPC .............. *G06V 20/42* (2022.01); *G06F 16/71* (2019.01); *G06F 16/75* (2019.01); *G06F 16/784* (2019.01);
(Continued)

(58) Field of Classification Search
CPC ........ G06F 16/784; G06F 18/00; G06F 16/75; G06F 16/71; G06T 2207/20081;
(Continued)

(56) References Cited

U.S. PATENT DOCUMENTS 11,048,977 B1 *   6/2021   Ulbricht ................. G06V 10/98
2007/0279494 A1 * 12/2007  Aman .................... G06V 20/40
348/169

(Continued)

FOREIGN PATENT DOCUMENTS

KR    10-2000-0064088 A   11/2000
KR         2004-054960 A    2/2004
(Continued)

*Primary Examiner* — Kenny A Cese
(74) *Attorney, Agent, or Firm* — NKL Law; Jae Youn Kim

(57) ABSTRACT

A method of operating a server providing a sports video-based platform service includes tracking a ball by using a pre-processing of leaving dynamic pixels in the sports video of a ball game, determining an unidentified player associated with a score-related scene of the sports video by using a ball tracking result, identifying the unidentified player by tracking the unidentified player up to an adjacent frame where the unidentified player is identifiable, and generating a time section of the sports video and identification information for the unidentified player, corresponding to the score-related scene.

6 Claims, 10 Drawing Sheets

(51) Int. Cl.
*G06F 16/783* (2019.01)
*G06F 16/71* (2019.01)
*G06F 16/75* (2019.01)
*G06V 10/74* (2022.01)
*G06V 10/774* (2022.01)
*G06V 10/94* (2022.01)
*G06T 5/20* (2006.01)
*G06T 7/215* (2017.01)

(52) U.S. Cl.
CPC ............... *G06T 5/20* (2013.01); *G06T 7/246* (2017.01); *G06V 10/74* (2022.01); *G06V 10/774* (2022.01); *G06V 10/945* (2022.01); *G06V 20/46* (2022.01); *G06T 2207/10016* (2013.01); *G06T 2207/20081* (2013.01); *G06T 2207/20092* (2013.01); *G06T 2207/30196* (2013.01); *G06T 2207/30224* (2013.01)

(58) Field of Classification Search
CPC . G06T 2207/10016; G06T 2207/30196; G06T 2207/30224; G06T 7/215; G06T 7/246; G06T 5/20; G06V 10/74; G06V 20/42; G06V 20/46; G06V 10/774; G06V 10/945

USPC .......................................................... 382/103
See application file for complete search history.

(56) References Cited

U.S. PATENT DOCUMENTS

| 2014/0301601 | A1  | 10/2014 | Marty et al. |
| 2015/0297949 | A1* | 10/2015 | Aman .................... G06T 7/246 |
|              |     |         | 348/157 |
| 2017/0161561 | A1* | 6/2017  | Marty .................... H04N 23/90 |
| 2018/0302610 | A1* | 10/2018 | Masuda ............... H04N 13/117 |
| 2019/0087661 | A1  | 3/2019  | Lee et al. |
| 2020/0057889 | A1* | 2/2020  | Lee ....................... G06Q 50/00 |

FOREIGN PATENT DOCUMENTS

| KR | 10-0785076 B1 | 12/2007 |
| KR | 10-2013-0060865 A | 6/2013 |
| KR | 10-1272645 B1 | 6/2013 |

* cited by examiner

OPERATING METHOD OF SERVER FOR PROVIDING SPORTS VIDEO-BASED PLATFORM SERVICE

TECHNICAL FIELD

The present disclosure relates to a method of operating a server providing a sports video-based platform service.

BACKGROUND

In order to analyze sports videos, human resources by professional personnel are required at a considerable level. Several solutions for analyzing sports videos have been presented, but the solutions still require dedicated shooting equipment or a dedicated team. Therefore, there is a need for a technique for efficiently analyzing sports videos in terms of resources.

DETAILED DESCRIPTION OF THE INVENTION

Technical Effect

The present disclosure provides a technology for remarkably reducing human resources required to analyze a sports video by using artificial intelligence technology. In addition, the present disclosure provides a technology for searching sports videos in detail by linking an analysis result of the sports video with a corresponding scene to form a database.

Technical Solution

In accordance with an exemplary embodiment of the present disclosure, a method of operating a video analysis server includes: receiving an analysis request signal including a link of a sports video of a ball game; performing pre-processing of leaving dynamic pixels by filtering out static pixels from a plurality of frames included in the sports video; tracking a ball in the sports video based on the pre-processed video; detecting a score-related scene of the sports video from the pre-processed video; determining, in response to detecting the score-related scene, an unidentified player associated with the score-related scene by using a ball tracking result; identifying the unidentified player by tracking the unidentified player up to an adjacent frame where the unidentified player is identifiable; and outputting a time section of the sports video and identification information for the unidentified player, corresponding to the score-related scene.

The tracking of the ball may include detecting, for each of the frames, a ball based on dynamic pixels of a corresponding frame.

The detecting of the score-related scene may include: detecting, for each of the frames, a rim based on dynamic pixels of the corresponding frame; and determining frames adjacent to the frame in which the rim is detected as the score-related scene.

The determining of the unidentified player associated with the score-related scene may include: detecting dynamic pixels related to a player attempting to score in frames included in the score-related scene by using the result of tracking the ball; and determining the unidentified player associated with the score-related scene by instance segmenting a frame in which the dynamic pixels related to the player attempting to score are detected.

The identifying of the unidentified player may include: extracting a feature from the determined unidentified player; comparing the extracted feature with features of previously registered players; determining whether or not the unidentified player is identifiable from a result of the comparing; and tracking the unidentified player by instance segmenting adjacent frames in response to determining that the unidentified player is not identifiable.

The performing of the pre-processing may include at least one of: filtering out static pixels based on a change in pixel values between adjacent frames of a predetermined range when the sports video is a video taken from a fixed viewpoint; and filtering out static pixels based on statistical values of optical flow of in-frame pixels when the sports video is a video taken from a moving viewpoint.

In accordance with another exemplary embodiment of the present disclosure, a method of operating a server providing a sports video-based platform service includes: transmitting a signal requesting analysis of a sports video to a video analysis module based on a link of the sports video; storing player-specific clusters received from the video analysis module in a database; providing information for extracting player-specific video clips from the sports video to a user terminal based on the database; receiving an input for identifying an unidentified player of at least one cluster from the user terminal provided with the video clips for each player from a streaming server; and updating identification information for at least one corresponding cluster in the database based on the input.

The method may further include: providing statistics indicating a contribution of players to the user terminal; receiving an input for selecting a detailed record included in the statistics from the user terminal; obtaining at least one sub-cluster associated with the selected detailed record based on the database; and providing information for extracting a video clip from the sports video to the user terminal based on the at least one sub-cluster.

The method may further include: receiving a search query including a search target player and a search target scene from the user terminal; searching the database for a sub-cluster corresponding to the search query; and providing information for extracting a video clip from the sports video to the user terminal based on the sub-cluster that has been searched for.

The method may further include at least one of: determining a charging level based on reliability of the clusters; and determining a reward level based on a feedback input that modifies the clusters.

The method may further include: receiving, from the user terminal, a feedback input indicating that a player of at least one section included in the at least one cluster does not belong to the cluster; and excluding the section from the cluster based on the feedback input.

The method may further include: receiving, from the user terminal, a feedback input indicating that a player of at least one section included in the at least one cluster belongs to another cluster; and excluding the section from the cluster and including the section in the other cluster based on the feedback input.

The method may further include: generating training data dependent on the updated database; and training a specialized model for estimating at least one of detection information, identification information, and motion type information for players based on the training data.

DETAILED DESCRIPTION OF EMBODIMENTS

Figure 1:
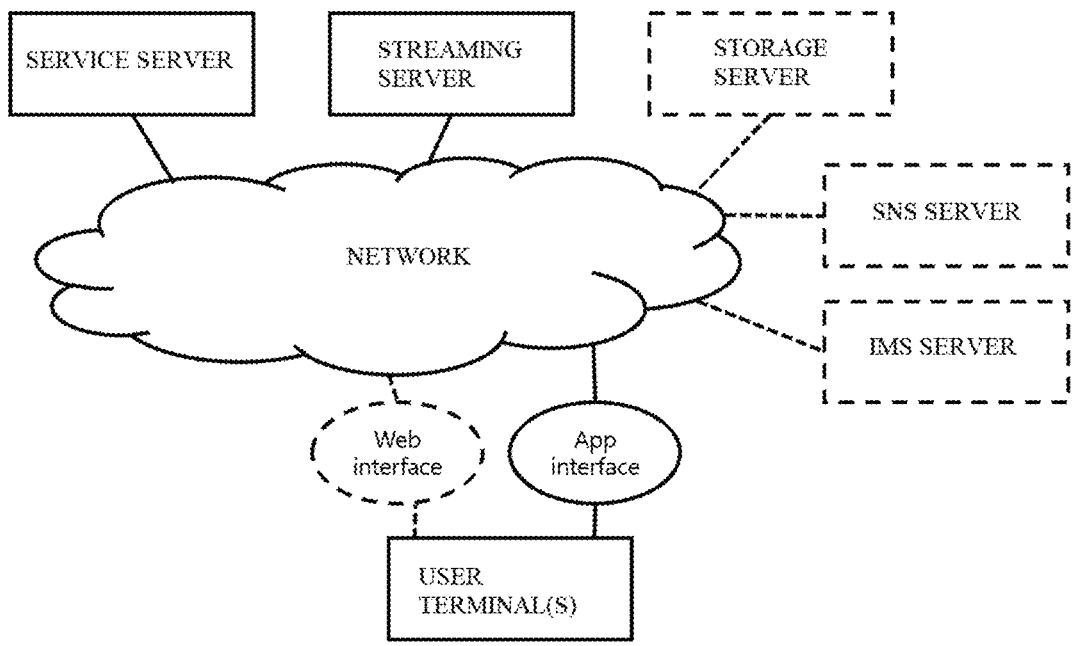
FIG. 1 is a view illustrating a system for providing a sports video-based platform service in accordance with an exemplary embodiment.

Specific structural or functional descriptions disclosed herein are merely illustrative for the purpose of describing exemplary embodiments according to technical concepts, and the exemplary embodiments may be embodied in various other forms and are limited to the exemplary embodiments described herein.

Terms such as first or second may be used to describe various elements, but the terms are to be understood only for the purpose of distinguishing one element from another element. For example, a first element may be termed a second element, and similarly, a second element may also be termed a first element.

It will be understood that when an element is referred to as being "coupled" or "connected" to another element, the element may be directly coupled or connected to the other element, or intervening elements may also be present. In contrast, it will be understood that when an element is referred to as being "directly coupled" or "directly connected" to another element, there are not intervening elements present. Expressions describing the relationship between elements, for example, "between" and "directly between" or "neighboring to" and "directly adjacent to", etc. should be interpreted similarly.

The singular forms, "a", "an", and "the" are intended to include the plural forms as well, unless the context clearly indicates otherwise. In the present specification, it should be further understood that the terms "includes" and/or "including" specify the presence of stated features, integers, steps, operations, elements, components, and/or groups thereof, but do not preclude the presence or addition of one or more other features, integers, steps, operations, elements, components, and/or groups thereof.

Unless otherwise defined, all terms used herein, including technical or scientific terms, have the same meaning as commonly understood by those of ordinary skill in the art. Terms, such as those defined in commonly used dictionaries, should be interpreted as having a meaning that is consistent with their meaning in the context of the related art and will not be interpreted in an idealized or overly formal sense unless expressly so defined herein.

The exemplary embodiments may be applied to various types of products, such as personal computers, laptop computers, tablet computers, smartphones, televisions, smart home appliances, intelligent cars, kiosks, wearable devices, and the like.

Hereinafter, exemplary embodiments of the present disclosure will be described with reference to the drawings. Like reference numerals in each figure indicate like elements.

FIG. 1 is a diagram illustrating a system for providing a sports video-based platform service in accordance with an exemplary embodiment. Referring to FIG. 1, a system in accordance with an exemplary embodiment includes a service server, and according to the design of the system, may further include at least one of a streaming server, a storage server, a social network service (SNS) server, and an instant messaging service (IMS) server. The service server may include a front-end server that communicates with an application installed in a user terminal and a video analysis server that analyzes a sports video. Depending on the design of the system, the front-end server and the video analysis server may be implemented in the form of modules within the same server, or may be implemented as different independent servers in the form of communicating with each other through a network.

The service server receives the sports video. The sports video is a moving image in which a sports game is captured and includes a plurality of frames. A sports game may correspond to any one of a real-time ball game such as basketball, soccer, volleyball, handball, hockey, ice hockey, and tennis, a turn-based ball game such as American football, rugby, baseball, croquet, and golf, and a non-ball game such as diving, swimming, skiing, and snowboarding. Hereinafter, a basketball game will be described as an example, but the exemplary embodiments may be applied in substantially the same manner to other sports games other than the basketball game.

The sports video may have already been uploaded to a streaming server or storage server. In this case, the service server may receive information (e.g., URL) for accessing the sports video through the streaming server or the storage server. Alternatively, the service server may receive a request to upload the sports video. The service server may upload the sports video requested to be uploaded to the streaming server or the storage server. The streaming server or the storage server may be operated by the same entity as the service server, or may be operated by different entities in accordance with an exemplary embodiment.

The sports video contains a plurality of unidentified players. The unidentified player is a player whose identity is not identified, and may include, for example, a player for whom identification information is not set. A plurality of unidentified players included in the sports video may perform various movements for a corresponding sports game, and by analyzing the sports video, individual or team capabilities of players participating in the corresponding sports game may be evaluated. However, in order to analyze the sports video, one or more experts who are familiar with the rules of a sports game in corresponding to the sports video have to perform recordings for each of players throughout the entire time of the corresponding sports game.

Exemplary embodiments described below provide a technology for remarkably reducing human resources required to analyze a sports video by using artificial intelligence technology.

In accordance with an exemplary embodiment, the video analysis server may receive an analysis request signal including a link to a sports video of a ball game from the front-end server. The video analysis server may perform pre-processing of leaving dynamic pixels by filtering out static pixels from a plurality of frames included in the sports video. For example, when the sports video is a video taken from a fixed viewpoint (a video taken with a fixed camera angle), static pixels may be filtered out based on a change in pixel values between adjacent frames of a predetermined range. When a pixel value at the same position changes between the adjacent frames beyond a predetermined threshold range, the pixel may be classified as a dynamic pixel.

Static pixels may be filtered out based on statistical values of optical flow of in-frame pixels when the sports video is a video taken from a moving viewpoint (video taken with a camera angle that moves following the ball). Due to the movement of the camera angle, the in-frame pixels may have a common optical flow component. When the optical flow of the common component included in the pixels is removed, an optical flow component of pixels corresponding to an actually moving object (a moving player, a moving ball, or a vibrating rim, or the like) may be obtained. After the optical flow of the common component is removed, a pixel having an optical flow of a size exceeding a predetermined threshold size may be classified as a dynamic pixel.

The video analysis server may track the ball in the sports video based on the pre-processed video. For example, the video analysis server may track the ball in the sports video by detecting, for each of the frames of the sports video, the ball based on dynamic pixels of a corresponding frame. Since the ball included in the sports video is shot relatively small as compared to other objects (player or goalpost, or the like) in the image, it is difficult to track the ball through the existing object tracking model. Exemplary embodiments may remarkably improve the performance of ball tracking by using an artificial neural network trained to track a ball using dynamic pixels obtained through preprocessing.

The video analysis server may detect a score-related scene of the sports video from the pre-processed video. For example, the video analysis server may detect a score-related scene of the video by detecting, for each of the frames, a rim based on dynamic pixels of a corresponding frame, and determining frames adjacent to the frame in which the rim is detected as the score-related scene.

The rim refers to a structure of a predetermined shape for determining whether or not a ball passes through for scoring in a ball sports game, and hereinafter, it may be understood that the net attached to the rim is also included in the rim. The rim is normally classified as a static pixel because it does not move; however, the rim may be classified as a dynamic pixel in a score-related scene, such as when the rim actually moves by a ball hitting the rim or when a moving ball passes through the rim. Accordingly, when the rim is detected in the pre-processed image, it may be determined that the scene is the score-related scene.

The video analysis server may determine, in response to detecting the score-related scene, an unidentified player associated with the score-related scene by using a result of tracking the ball. The video analysis server may detect dynamic pixels related to a player attempting to score in frames included in the score-related scene by using the result of tracking the ball, and determine the unidentified player associated with the score-related scene by instance-segmenting a frame in which the dynamic pixels related to the player attempting to score are detected.

Since the video analysis server tracks the ball in the pre-processed image, when a rim is detected in the pre-processed image, the movement trajectory of the ball included in previous adjacent frames, starting from the frame in which the rim is detected, may be obtained. The video analysis server may select dynamic pixels that are close to the ball within a predetermined reference distance from among the dynamic pixels of the player included in the adjacent frames while tracing the movement trajectory of the ball. The selected dynamic pixels may include the unidentified player attempting to score.

When the dynamic pixels that come close to the ball within the predetermined reference distance are selected, the video analysis server may instance-segment the corresponding frame to obtain the mask of the unidentified player attempting to score. In this case, an image of an original frame that has not been pre-processed may be input as an input of a neural network model performing instance segmentation.

The video analysis server may identify the unidentified player by tracking the unidentified player up to an adjacent frame where the unidentified player is identifiable. For example, the video analysis server may extract a feature from the determined unidentified player. The video analysis server may obtain pixel values corresponding to the unidentified player by using the mask of the unidentified player, and extract the feature based on the obtained pixel values.

The video analysis server may compare the extracted features with features of previously registered players to determine whether the unidentified player may be identified. The video analysis server may receive, from the service server, registration information for players participating in the sports game requested to be analyzed. The registration information may include a list of players and photos of the players. The video analysis server may extract features from photos of pre-registered players and compare them with features of unidentified players. The video analysis server may match the unidentified player with one of the pre-registered players according to the comparison result.

When it is determined that the unidentified player may not be identified from the comparison result, the video analysis server may track the unidentified player by instance-segmenting adjacent frames (past or future adjacent frames). Due to various factors, such as the unidentified player being obscured by another player, video information for identifying the unidentified player may not be sufficiently included in a frame containing the attempt to shoot. The video analysis server may track the unidentified player up to an adjacent frame that sufficiently includes video information for identifying the unidentified player. After tracking the unidentified player in the adjacent frame, the video analysis server may determine whether to identify the unidentified player based on image information for the unidentified player tracked in a corresponding adjacent frame. The video analysis server may repeatedly perform a tracking operation and an identification operation in adjacent frames until the unidentified player may be identified.

The video analysis server may determine whether the scoring has been successful or has failed in the score-related scene. For example, the video analysis server may use a neural network model trained to determine whether scoring is successful with the movement trajectory of the ball based on the position of the rim in a plurality of frames included in the score-related scene as an input.

The video analysis server may respond to the analysis request signal of the front-end server by outputting a time section of the sports video, identification information for the unidentified player, and/or the success or failure of the scoring for each of the score-related scenes. The front-end server may build a database based on the response signal.

In accordance with an exemplary embodiment, the service server may distinguish the unidentified players included in the sports video from each other using an unsupervised learning technique. The service server may distinguish a first unidentified player and a second unidentified player from each other even in a situation in which each of the unidentified players is not identifiable. For example, appearance features of the first unidentified player and appearance features of the second unidentified player may be distinguished from each other in the sports video. The appearance features are external features of an unidentified player, and may include, for example, not only external features of the unidentified player himself or herself such as a physique, height, skin color, hair style, and face, but also external features of sportswear, uniform numbers, shoes, protectors, and accessories. In addition, motion features of the first unidentified player and motion features of the second unidentified player may be distinguished from each other. The motion features are movement features of an unidentified player, and may include, for example, features of postures or movements unique to the corresponding unidentified player in various motions such as jump shot motion, set shot motion, layup motion, dunk motion, dribble motion, pass motion, pick motion, rebound motion, blocking motion, and defense motion in a basketball game. The service server may use appearance features and/or motion features to distinguish unidentified players from each other.

The service server may generate unidentified player-specific video clips that are distinguished from each other. For example, among all the game images, the service server may generate a first video clip selectively including only the image of the first unidentified player, and generate a second video clip selectively including only the image of the second unidentified player. The service server may receive information for identifying the unidentified player of the video clip from the user by providing the unidentified player-specific video clips to the user. The user may be one of the unidentified players in a corresponding sports video, and in some cases, the user may be a person who is not an unidentified player in the sports video but may identify the unidentified players in the sports video.

The user may input information for identifying an unidentified player corresponding to at least one video clip among the plurality of video clips. For example, the user inputs something to confirm the user into the user's own video clip among video clips, or input information for identifying an unidentified player into a video clip of the corresponding unidentified player that the user may identify among video clips.

The service server may analyze the sports video based on identification information input for each video clip. Since most sports games are played based on predetermined rules, motion types allowed in the rules of the sports game may be predetermined. Therefore, one motion type and another motion type may be distinguished from each other. For example, in the basketball game, a shot motion and a dribbling motion may be distinguished from each other. Furthermore, among the shot motions, a jump shot motion and a dunk shot motion may be distinguished from each other. Accordingly, the service server may extract feature scenes or frames from the sports video and classify motion types of the extracted scenes. As will be described in detail below, the service server may extract some regions rather than the entire scene or all frames, and classify motion types of the extracted regions.

Therefore, exemplary embodiments may provide a technique for analyzing various moments in the sports game by only receiving identification information for each video clip from the user. Furthermore, as image data in which the same player is identified accumulated, a specialized model for automatically identifying the corresponding player may be trained. The specialized model may be trained not only to automatically identify the corresponding player, but also to more accurately classify movements of the corresponding player.

In addition, the service server may build a database by tagging identification information and motion type information at moments detected in the sports video. The user may search for a desired image in the database through various queries. For example, the user may input a query to i) designate a player and ii) search for a desired scene. The service server may search database for the sports video in which the scene corresponding to the query is and the time point (frame) to which the scene corresponds, and may generate a video clip based on the search result and provide the generated video clip to the user. In accordance with an exemplary embodiment, by designating a plurality of players, a desired scene, for example, a scene in which player B scores with an assist from player A, or a scene in which player C is blocked by player D, may be searched for.

As will be described in detail below, the service server may generate statistics indicating the contribution of each player in the sports game. For example, the service server may generate a box score expressing the result of a basketball game numerically. For each detailed record in the box score, the service server may provide a service for linking scenes of the detailed record. For example, when a detailed record of a particular player on 'steal' is selected in the box score, a video clip containing scenes of that the corresponding player's 'stealing' may be provided. In accordance with an exemplary embodiment, the front-end server may search for steal-related clusters of a specific game in response to a selection input of 'stealing' in the box score of the game. The front-end server may provide the user terminal with information (e.g., an image URL and at least one time section) by which a related video clip may be streamed, based on the clusters that have been searched for.

The service server may share the video clip provided to the user with a social network server or an instant messaging server. The service server may provide a service to the user through a web interface or may provide a service to the user through an app interface.

Figure 2:
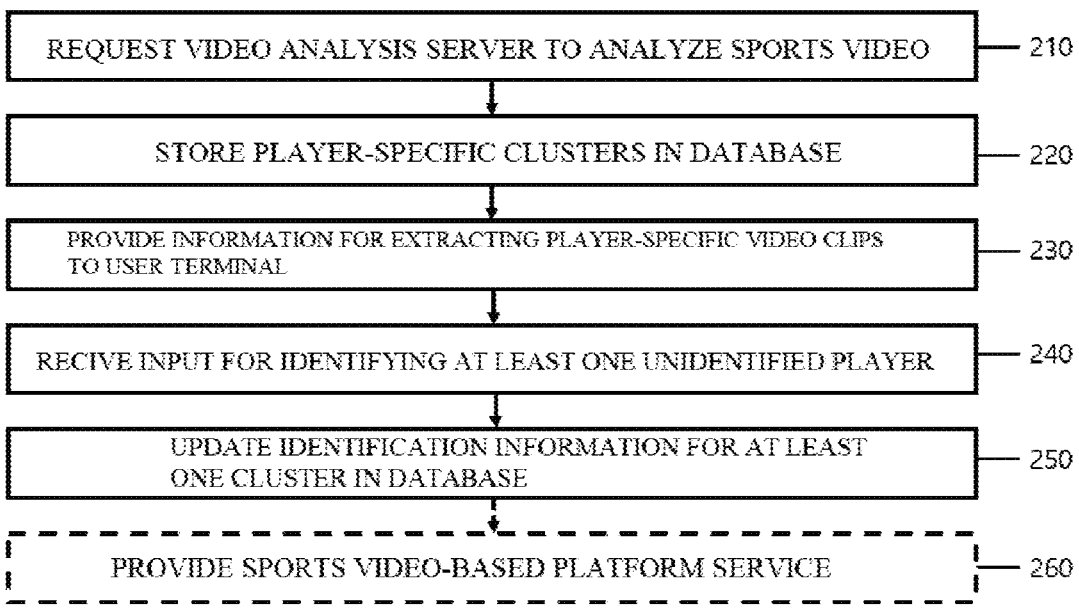
FIG. 2 is an operation flowchart illustrating a method of operating a service server providing the sports video-based platform service in accordance with an exemplary embodiment.

FIG. 2 is an operation flowchart illustrating a method of operating a service server providing the sports video-based platform service in accordance with an exemplary embodiment. As described above with reference to FIG. 1, the service server may be implemented as a single server of the front-end module and the video analysis module, or may be implemented as separate servers, that is, the front-end server and the video analysis server. Hereinafter, for convenience of description, an exemplary embodiment implemented as a single server will be described.

Referring to FIG. 2, the front-end module of the service server transmits a signal requesting analysis of a sports video to the video analysis module based on the link of the sports video (210). The front-end module of the service server stores player-specific clusters received from the video analysis module in a database (220). The player-specific clusters may include section information regarding scenes (e.g., a score-related scene, a defense-related scene, an error or foul-related scene, or the like) that may be calculated as contribution to the game for each player.

The front-end module of the service server provides information for extracting player-specific video clips from the sports video to a user terminal based on the database (230). The information provided to the user terminal may include a link of the video and a time section for a main scene for each player. The user terminal may request the streaming server to selectively stream only a time section corresponding to a corresponding main scene, based on the received information.

The front-end module of the service server receives an input for identifying an unidentified player of at least one cluster from the user terminal (240). The front-end module of the service server updates identification information for at least one corresponding cluster in the database based on the user input (250).

The service server receives an input for identifying an unidentified player of at least one cluster from the user. Since the user is provided with a video clip for each unidentified player, the input for identifying the unidentified player may be made for each video clip. The video clip is extracted or generated in units of clusters, and the received input corresponds to information for identifying an unidentified player corresponding to the corresponding cluster.

The service server sets identification information for at least one corresponding cluster based on the user input. In accordance with an exemplary embodiment, the cluster may include fields of {access information, identification information, and indexes of regions, for the sports video}. In this case, the service server may set identification information for the cluster based on the user input. The identification information may correspond to account information in a sports video-based platform service. Alternatively, the identification information may correspond to account information in a social network service interworking with the sports video-based platform service or account information in an instant messaging service interworking with the sports video-based platform service. The identification information may include information (e.g., last name, first name, nickname, team, uniform number, gender, age, height, weight, position, or the like) for a predetermined template for identifying an unidentified player. In accordance with an exemplary embodiment, the identification information may be stored in a region. In this case, the cluster may include fields of {indexes of regions}, and each region may include a field of {identification information}.

Alternatively, the service server may receive, from the user terminal, a feedback input stating that the player of at least one section included in at least one cluster does not belong to the cluster, and exclude the section from the cluster.

Alternatively, the service server may receive, from the user terminal, a feedback input stating that the player of at least one section included in at least one cluster belongs to another cluster, and exclude the section from the cluster, and include the excluded section in another cluster.

In addition, the front-end module of the service server may provide the sports video-based platform service (260). For example, the service server may provide the sports video-based platform service based on clusters (or regions) in which identification information is set. The service server may provide various services, for example, may automatically analyze the sports game, provide statistical information obtained by indexing the contents of sports games, provide video clips linked with statistical information, provide detailed search functions for the sports video, or provide a video clip corresponding to the search result. In addition, the service server may also provide a function of sharing the video clip with a social network service or an instant messaging service.

The service server may provide statistics indicating the contribution of players to the user terminal, and receive an input for selecting a detailed record included in the statistics from the user terminal. The service server may obtain at least one sub-cluster related to the selected detailed record based on the database, and provide, to the user terminal, information for extracting a video clip from the sports video based on the at least one sub-cluster.

Alternatively, the service server may receive a search query including a search target player and a search target scene from the user terminal, and search for a sub-cluster corresponding to the search query from the database. The service server may provide information for extracting a video clip from the sports video to the user terminal based on the sub-cluster that has been searched for.

Alternatively, the service server may determine a charging level based on the reliability of the clusters, or may determine a reward level based on a feedback input for modifying the clusters.

In addition, the service server may generate training data dependent on the updated database to train a specialized model for estimating at least one of detection information, identification information, and motion type information for players.

The service server may train the specialized model for the identified player based on clusters (or regions) in which identification information is set. Alternatively, the service server may train the specialized model for a team to which a plurality of identified players belong. The specialized model may be trained as a detection module for detecting regions of players in the sports video, a classification module for classifying regions, an identification module for identifying regions, or a complex module for various combinations of the above-described functions.

The service server may provide a higher quality service regarding the player for which identification information is input by using the specialized model. As an example, as data in which identification information is set is accumulated and the specialized model is trained, in a new sports video, even identification information for a corresponding player may be automatically set. In addition, the game content of the corresponding player may be analyzed more accurately through the specialized model.

Although not shown in the drawing, in accordance with an exemplary embodiment, the service server detects regions corresponding to unidentified players from a sports video on which the unidentified players are captured. 'detection' may be an operation of determining a partial region corresponding to a detection target in an image. The sports video includes a plurality of frames, and the service server may detect a region occupied by an individual unidentified player in each frame. The service server may use a detector that detects players playing a corresponding sports game in the sports video to detect regions corresponding to unidentified players. The regions corresponding to the unidentified players may have a predetermined shape, for example, a rectangular window shape. The service server may detect windows corresponding to unidentified players in each frame of the sports video as a unit. As an example, the service server may obtain a frame index indicating a frame, (x,y)-coordinate, which is information indicating the position of the detected window, and (width, height), which is information indicating the size of the detected window. In this case, each region may be defined as {frame_index, x-coordinate, y-coordinate, width, height}. The service server may directly drive the detection module, or may request detection from another server that drives the detection module in conjunction with the service server.

The service server generates unidentified player-specific clusters by clustering the detected regions to distinguish unidentified players from each other (220). The service server may cluster regions based on unsupervised learning techniques. For example, the service server may cluster regions by using a cluster analysis technique, which is represented by a K-means clustering technique. The generated cluster may include information indicating regions belonging to the cluster (e.g., indexes of the regions).

A K parameter for clustering may be set by receiving the number of players participating in a game from the user. Alternatively, the number of players participating in a sports game corresponding to a sports video may be estimated by setting the number of players that are allowed to participate simultaneously as the initial value of the K parameter depending on the sports game (for example, in case of basketball, five players per team for a total of ten players), and iteratively performing the clustering while adjusting the value of the K parameter. Considering substitute members, the number of players participating in the sports game may be greater than the number of players that are allowed to participate simultaneously. As described in detail below, in accordance with an exemplary embodiment, the service server may use a hierarchical clustering technique as a cluster analysis technique.

The service server may extract features of a region for clustering. In accordance with an exemplary embodiment, the service server may extract an appearance feature from an individual region. The appearance feature may be defined in a variety of ways. For example, the appearance feature is a multi-dimensional vector, and may include information related to a physique, height, skin color, hair style, face, sportswear, uniform number, shoes, protector, accessories, or the like in each dimension. Alternatively, the service server may extract a motion feature from the sequence of regions. The motion feature may be defined in a variety of ways. As an example, the motion feature is a multidimensional vector and may include information extracted from the posture of the unidentified player or information extracted from the movement of the unidentified player.

Figure 3:
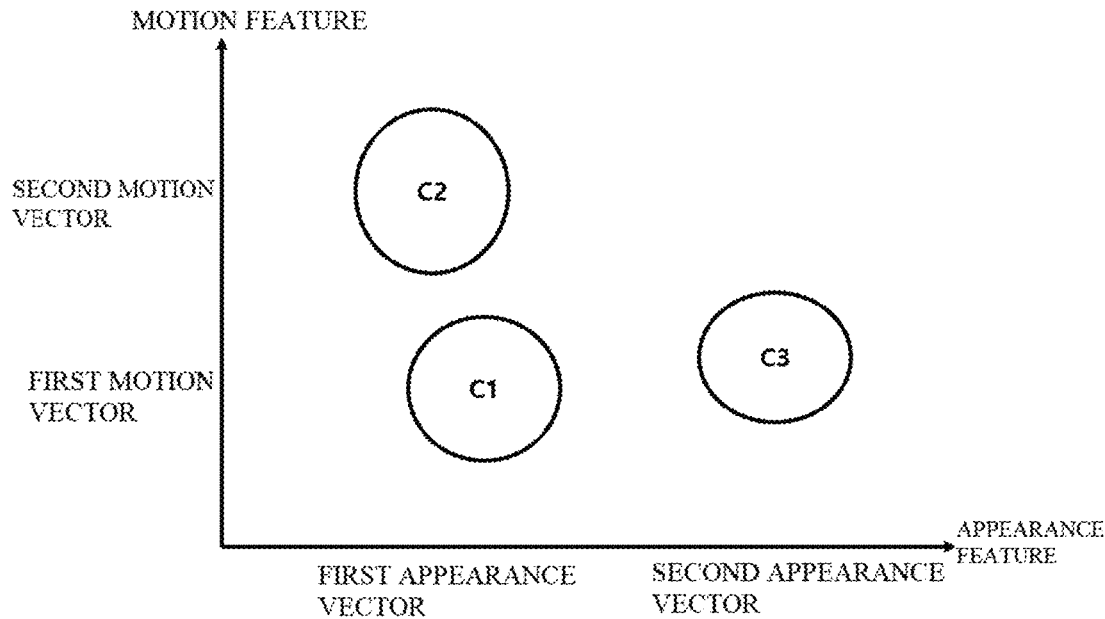
FIG. 3 is a view illustrating a clustering operation in accordance with an exemplary embodiment.

The service server may cluster regions based on the appearance feature or the motion feature. For example, the service server may classify regions having similar appearance features as the same cluster, and classify regions having different appearance features into different clusters. Alternatively, the service server may classify regions having similar motion features as the same cluster, and classify regions having different motion features into different clusters. In accordance with an exemplary embodiment, the service server may cluster regions based on a combination of the appearance feature and the motion feature. For example, referring to FIG. 3, the service server may classify regions having similar combinations of appearance features and motion features as the same cluster, and classify regions having different combinations of appearance features and motion features into different clusters. For convenience of description, only three clusters are shown in FIG. 3, but as described above, as many clusters as the number of unidentified players included in the sports video may be generated. In addition, the appearance feature and the motion feature have been each illustrated in a single dimension in FIG. 3; however, the appearance feature or the motion feature may include multidimensional information as described above.

In accordance with an exemplary embodiment, the appearance feature may be extracted from a region of a single frame, and the motion feature may be extracted from a region sequence of a plurality of frames. In this case, a synchronization operation between the region and the region sequence may be required. As an example, the appearance feature of the region detected in a specific frame may be statistically processed (average, or the like) together with the appearance features of regions detected in a previous frame and a subsequent frame with respect to the detected region. The range of the previous frame and the subsequent frame may correspond to a frame range of the region sequence for extracting the motion feature.

The service server extracts unidentified player-specific video clips from the sports video based on the generated clusters (230). The service server may obtain, for each cluster, frame indexes of regions included in the cluster, and the location and size of regions within each frame. The service server may generate a video clip for an individual cluster by extracting frames of frame indexes corresponding to each cluster from the sports video.

In accordance with an exemplary embodiment, the service server may provide a visual effect to the video clip. The service server may cut the frame extracted from the sports video based on the location and size of the region within the frame. Alternatively, the service server may provide a visual effect of highlighting a region in a frame based on the location and size of the region in the frame. Alternatively, the service server may add cluster-related information or region-related information in the form of captions or the like.

The service server provides the extracted video clips to the user for each unidentified player. The service server may provide the video clips to the user through a web interface and/or an app interface. In accordance with an exemplary embodiment, the service server may provide the video clips to the user through a social networking service and/or an instant messaging service.

Figure 4:
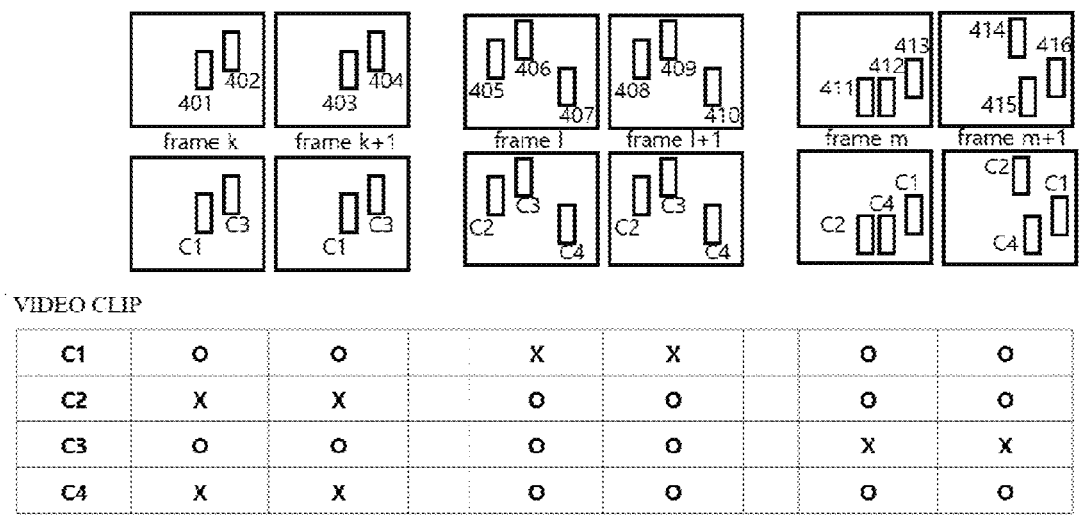
FIG. 4 is a view illustrating a sports video-based platform service in accordance with an exemplary embodiment.

FIG. 4 is a view illustrating a sports video-based platform service in accordance with an exemplary embodiment. Referring to FIG. 4, a sports video may include a plurality of frames ( . . . , k, k+1, . . . , l, l+1, . . . , m, m+1, . . . ). The service server may detect regions 401 to 416 of a plurality of unidentified players in the plurality of frames.

The service server may cluster the regions 401 to 416 using an unsupervised learning technique. For example, the service server may classify the region 401, the region 403, the region 413, and the region 416 as a first cluster C1, the region 405, the region 408, the region 411, and the region 414 as a second cluster C2, the region 402, the region 404, the region 406, and the region 409 as a third cluster C3, and the region 407, the region 410, the region 412, and the region 415 as a fourth cluster C4.

The service server may extract unidentified player-specific video clips from the sports video based on the first to fourth clusters. For example, the service server may generate a video clip for a first unidentified player by extracting frames (k, k+1, m, m+1) corresponding to the first cluster. In addition, the service server may generate a video clip for a second unidentified player by extracting frames (1, 1+1, m, m+1) corresponding to the second cluster. The service server may generate a video clip for a third unidentified player by extracting frames (k, k+1, 1, 1+1) corresponding to the third cluster. The service server may generate a video clip for a fourth unidentified player by extracting frames (1, 1+1, m, m+1) corresponding to the fourth cluster.

The service server may receive identification information for each video clip by providing video clips generated for each unidentified player to the user. For example, the service server may receive identification information for a first player of team A corresponding to the first cluster, receive identification information for a second player of team A corresponding to the second cluster, receive identification information for a first player of team B corresponding to the third cluster, and receive identification information for a second player of team B corresponding to the fourth cluster.

The service server may collect identification information received from a plurality of users. For example, the service server may receive, from a first user, an input for identifying a video clip of the first cluster, and receive, from a second user, an input for identifying a video clip of the second cluster. Alternatively, the service server may receive information identifying a video clip of the same cluster from a plurality of users, and employ identification information having the highest reliability. For example, the service server may receive different identification information for the video clip of the same cluster from a plurality of users. In this case, the service server may employ the identification information input by the most users. Alternatively, the service server may employ identification information input by a user with the highest reliability. Alternatively, the service server may assign scores to the identification information input by users based on the reliability of the users, and may employ the identification information having the highest score. The reliability of the users may be determined based on the users' previous histories of using a sports video-based platform service or the users' user authentication levels.

Figure 5:
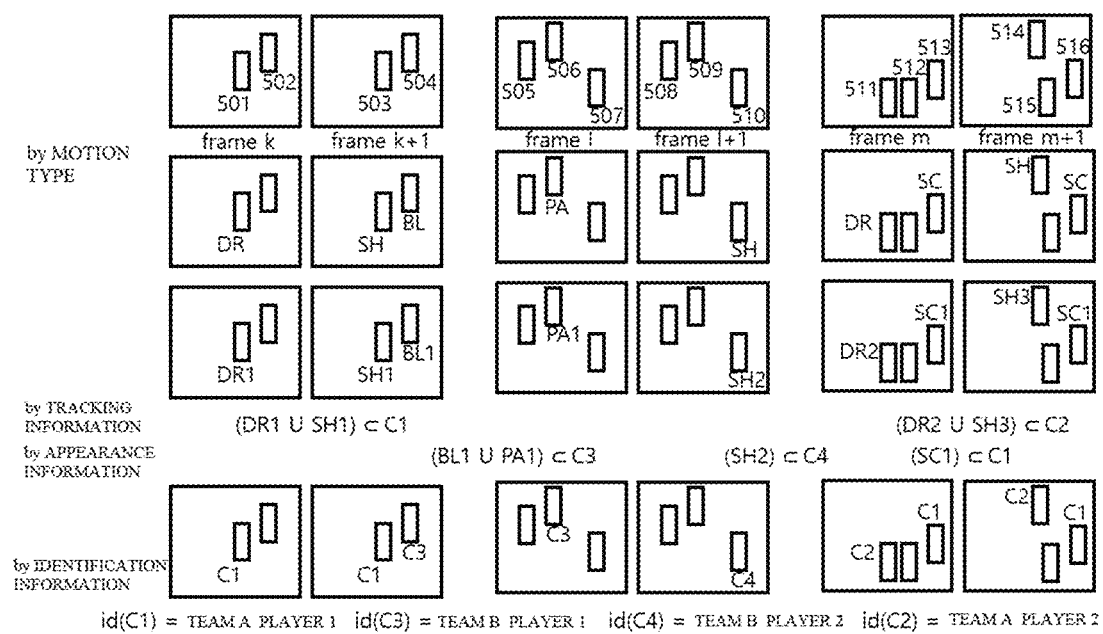
FIG. 5 is a view illustrating a sports video-based platform service in accordance with an exemplary embodiment.

FIG. 5 is a view illustrating a sports video-based platform service in accordance with an exemplary embodiment. The service server may perform clustering for each motion type. To this end, the service server may classify regions of unidentified players detected in a sports video into predetermined motion types, and may cluster motion type-specific regions. Alternatively, the service server may hierarchically cluster regions using a hierarchical clustering technique.

Figure 6:
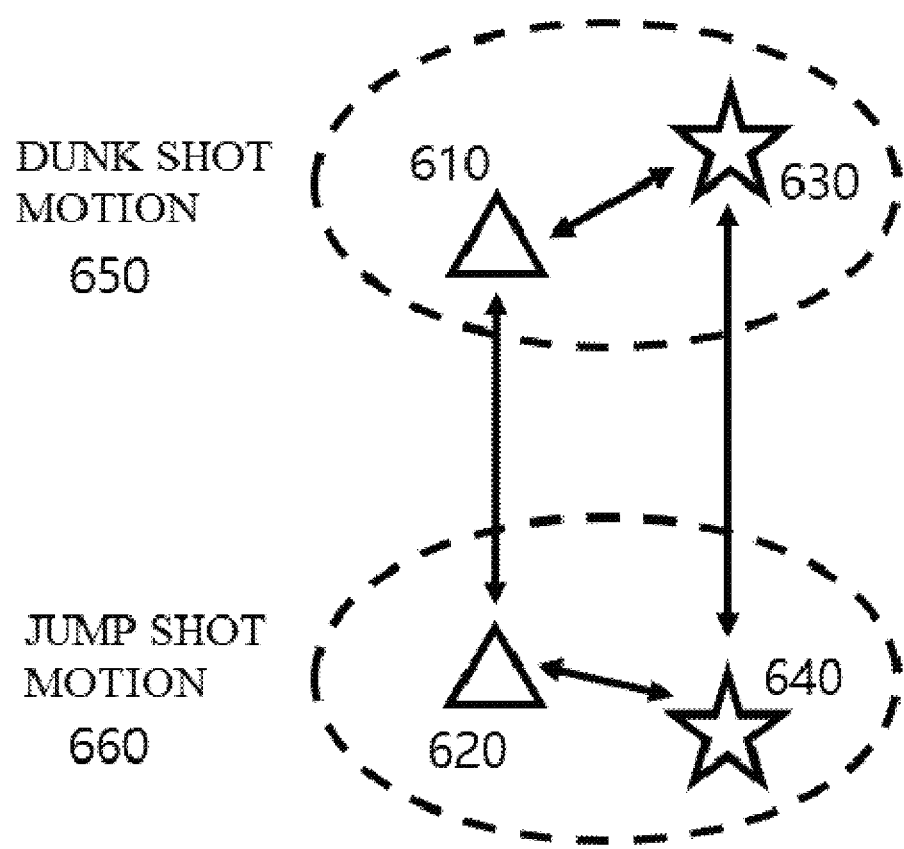
FIG. 6 is a view illustrating distribution of feature vectors according to a motion type in accordance with an exemplary embodiment.

Motion type-specific features in a sports game may be included in common among unidentified players. For example, a dunk shot motion of the first unidentified player and a dunk shot motion of the second unidentified player may include a motion feature for a dunk shot in common. Further, a jump shot motion of the first unidentified player and a jump shot motion of the second unidentified player may include a motion feature for a dunk shot motion in common. Referring to FIG. 6, the dunk shot motion of the first unidentified player is expressed as a motion vector 610, the jump shot motion of the first unidentified player is expressed as a motion vector 620, the dunk shot motion of the second unidentified player may be expressed as a motion vector 630, and the jump shot motion of the second unidentified player may be expressed as a motion vector 640.

In the exemplary embodiment of FIG. 6, the distance between the motion vector 610 and the motion vector 620 may be greater than the distance between the motion vector 610 and the motion vector 630, and the distance between the motion vector 640 and the motion vector 630 may be greater than the distance between the motion vector 640 and the motion vector 620. In this case, clustering may not be performed for each unidentified player, but may be clustered for each motion type.

In accordance with an exemplary embodiment, the service server may classify motion types of regions, and then perform clustering among the regions corresponding to the same motion type. In this case, the regions may be classified into a first cluster 650 corresponding to the dunk shot motion and a second cluster 660 corresponding to the jump shot motion. In accordance with an exemplary embodiment, region detection and motion type classification may be simultaneously performed. For example, the detection module trained to detect unidentified players from the sports video and classify motion types of their corresponding regions may be used. Of course, in accordance with an exemplary embodiment, region detection and motion type classification may be performed by separate modules (or neural networks). After classifying the regions for each motion type, the service server may cluster motion type-specific regions to distinguish unidentified players from each other for each motion type.

In accordance with an exemplary embodiment, the service server may first perform a primary clustering using a hierarchical clustering technique, and then perform a secondary clustering within each cluster. In this case, through the primary clustering, the first cluster 650 and the second cluster 660 may be generated, and through the secondary clustering, the first unidentified player and the second unidentified player may be distinguished from each other in the first cluster 650 and the first unidentified player and the second unidentified player may be distinguished from each other in the second cluster 660. K1 for the primary clustering may correspond to the number of motion types allowed in the corresponding sports game, and K2 for the secondary clustering may correspond to the number of players participating in the corresponding sports game.

Figure 7:
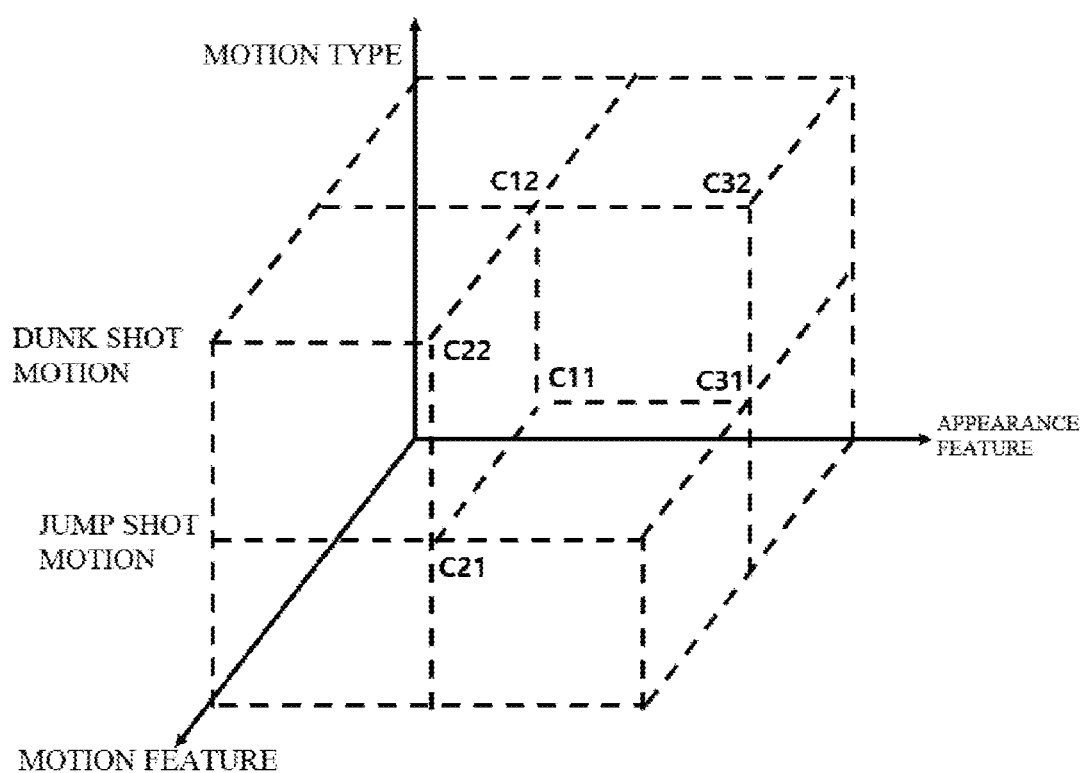
FIG. 7 is a view illustrating a clustering operation according to a motion type in accordance with an exemplary embodiment.

Referring to FIG. 7, an exemplary embodiment in which sub-clusters are generated by clustering regions according to the motion type, the motion feature, and the appearance feature is shown. Referring back to FIG. 6, as will be described in detail below, a sub-cluster corresponding to the first unidentified player in the first cluster 650 and a sub-cluster corresponding to the first unidentified player in the second cluster 660 may match each other based on tracking information, appearance information, or a combination thereof. Of course, a sub-cluster corresponding to the second unidentified player in the first cluster 650 and a sub-cluster corresponding to the second unidentified player in the second cluster 660 may also match each other based on tracking information, appearance information, or a combination thereof.

Referring to FIG. 5, the service server may classify regions 501 to 516 for each motion type. For example, the region 501 and the region 511 may be classified as a dribble motion, the region 503, the region 510, and the region 514 may be classified as a shot motion, and the region 504 may be classified as a block motion, the region 506 may be classified as a pass motion, and the region 513 and the region 516 may be classified as a screen motion.

The service server may cluster motion type-specific regions to distinguish unidentified players from each other for each motion type. For example, the service server may cluster the region 501 and the region 511 classified as the dribble motion into different sub-clusters DR1 and DR2. The service server may cluster the region 503, the region 510, and the region 514 classified as the shot motion into different sub-clusters SH1, SH2, and SH3. The service server may cluster the region 513 and the region 516 classified as the screen motion as the same sub-cluster SC1.

The service server may match sub-clusters of different motion types by using tracking information for the regions. For example, the service server may classify DR1 and SH1 as the same cluster C1 by matching DR1 and SH1 based on tracking information indicating that the region 501 and the region 503 are continuous regions. The service server may classify DR2 and SH3 as the same cluster C2 by matching DR2 and SH3 based on tracking information indicating that the region 511 and the region 514 are continuous regions.

The service server may match sub-clusters of different motion types by using appearance information for regions. For example, the service server may classify BR1 and PA1 as the same cluster C3 with the determination that the external features of the region 514 and the external features of the region 506 are similar. The service server may classify SC1 as the cluster C1 with the determination that the external feature of the region 513 and the external feature of the region 502 or 503 are similar.

In the exemplary embodiment of FIG. 5, an example in which regions are classified for each motion type and then clustered has been described; however, even when the hierarchical clustering technique is used as described above, substantially the same operation may be performed. In addition, an example in which the appearance information is applied after applying the tracking information for matching sub-clusters has been described; however, the order or method of applying the tracking information and the appearance information may be variously modified.

In accordance with an exemplary embodiment, the service server may generate video clips using sub-clusters according to predetermined motion types. For example, the service server may generate video clips by using only sub-clusters of motion types corresponding to an attack motion. Furthermore, the service server may generate video clips by using only the region sequence corresponding to a scene in which the score is successful during the attack motion.

Figure 8:
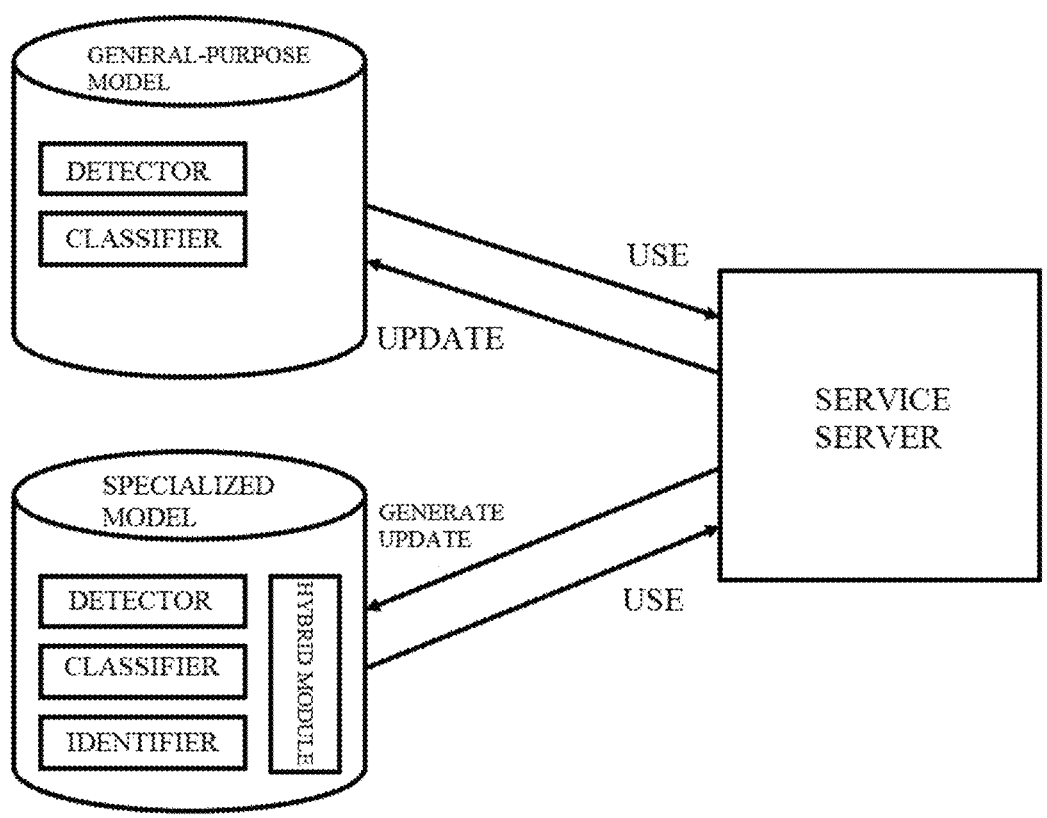
FIG. 8 is a view illustrating a general-purpose model and a specialized model in accordance with an exemplary embodiment.

FIG. 8 is a view illustrating a general-purpose model and a specialized model in accordance with an exemplary embodiment. Referring to FIG. 8, the general-purpose model may include a detector for detecting unidentified players from a sports video for the general purpose and a classifier for classifying the motion type of the detected region for the general purpose. The general-purpose model may include a detector or classifier that is independently trained on the data for unidentified players.

The specialized model may be specialized for a specific player, a specific group, or a specific team using a database in which identification information is set according to a sports video-based platform service, and may include a detector for detecting a player, a classifier for classifying motion types, an identifier for identifying a player, or a hybrid module in which the detection function, the classification function, and/or the identification function are variously combined. The general-purpose model and the specialized model may be an artificial neural network-based model. In this case, the database may contain training data dependent on data for players for which identification information is set.

The specialized model may be a model newly trained for a specific group, or may be a model additionally trained to suit a specific group based on the general-purpose model in accordance with an exemplary embodiment. For example, by additionally training the general-purpose model so as to be specialized to a specific group according to nationality, age group, gender, and the like for the purpose of providing higher performance, the specialized model may be generated.

The service server may automatically set identification information for unidentified player-specific clusters from a newly received sports video by using the specialized model. The sports video may be a live streaming video, and in this case, the service server may generate, in real time, statistics indicating the contribution of players automatically identified from the sports video based on the specialized model. The statistics indicating the contribution of players may include not only the scores of both teams during a basketball game, but also detailed records of an individual player, such as the number of successful scoring, the number of attempts to score, the team gained and lost during his or her playing time, the total score, the number of offensive rebounds, the number of defensive rebounds, the number of assists, and the number of steals, the number of blocks, the number of being blocked, the number of fouls, and the number of turnovers.

Figure 9:
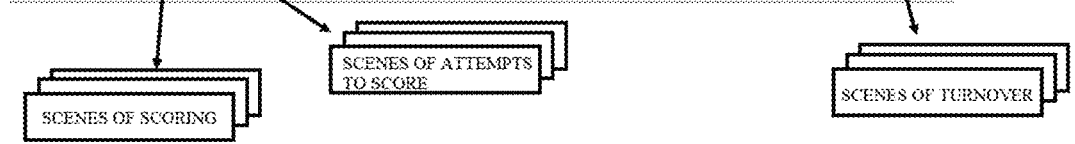
FIG. 9 is a view illustrating video clips provided in association with statistics indicating contribution for each player in a basketball game in accordance with an exemplary embodiment.

FIG. 9 is a view illustrating video clips provided in association with statistics indicating contribution for each player in a basketball game in accordance with an exemplary embodiment. Referring to FIG. 9, the service server may generate a box score statistically indicating the contribution of each player to a game according to identification information for a region detected in a basketball video and a motion type of the region.

The service server may determine whether to additionally analyze the sports video according to the motion type of the region. For example, the service server may additionally analyze the shot by the determination that the motion type is a shot motion to check whether or not the shot has been successful. The service server may check whether the ball has passed through the rim after the frame of the shot motion. The service server may detect regions corresponding to the rim in frames after the shot motion, and may determine whether the ball has passed in the detected region.

In addition to providing the box score, the service server may provide video clips including scenes of a selected detained record in response to selection of the detained record within the box score. For example, FG in the box score may be expressed as 'number of successful scoring'-'number of attempts to score', such as 08-14. When the user selects 08 corresponding to the 'number of successful scoring', the service server may generate a video clip including scenes in which a corresponding player succeeds in scoring in a corresponding game and provide the video clip to the user.

More specifically, the detailed records of the box score may store corresponding regions (or sub-clusters) in a data structure such as a linked list. The service server may obtain related regions along the linked list, and extract a video clip from the basketball video based on information (frame index, window position, window size, or the like) stored in each region. As described above, the service server may also provide a visual effect to the video clip.

Figure 10:
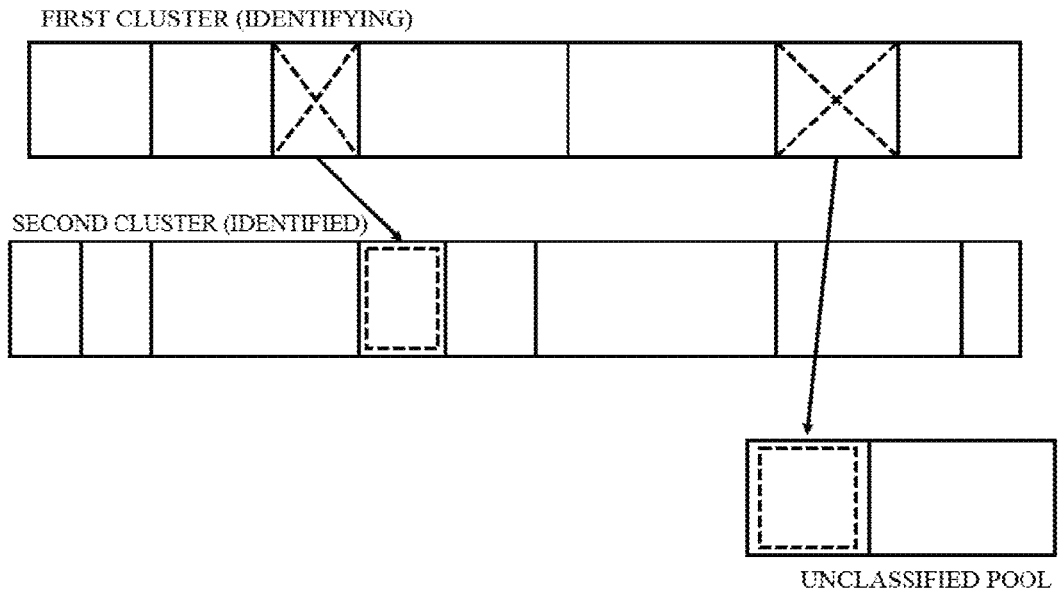
FIG. 10 is a view illustrating a function of reflecting a feedback of a user on a video clip in accordance with an exemplary embodiment.

FIG. 10 is a view illustrating a function of reflecting a feedback on a video from a user clip in accordance with an exemplary embodiment. Referring to FIG. 10, the service server may receive a feedback on a video clip from the user. For example, the service server may receive, from the user, a feedback input 1010 indicating that an unidentified player of at least one region included in a cluster of video clips does not belong to the cluster. The service server may exclude or remove the region from the cluster, or furthermore, may exclude or remove a sub-cluster 1015 including the region from the cluster. In this case, in accordance with an exemplary embodiment, the service server may temporarily store the excluded region or sub-cluster in an unclassified pool. The service server may inquire as to which cluster the sub-clusters belong to while providing the user with video clips of the sub-clusters temporarily stored in the unclassified pool.

Alternatively, the service server may receive, from the user, a feedback input 1020 indicating that an unidentified player of at least one region included in a cluster of video clips belongs to another cluster. The service server may exclude or remove the region or a sub-cluster 1025 including the region, from the cluster. The service server may include the excluded region or sub-cluster in another cluster designated by the user.

Although not shown in the drawing, the service server may determine a charging level differentially according to the accuracy (or reliability) of the service. For example, the service server may discount a service cost according to detection accuracy, classification accuracy, or a combination thereof, based on the service cost per game (e.g., $1). The detection accuracy and/or classification accuracy may be referred to as cluster accuracy.

In addition, the service server may determine a reward level according to the feedback input of the user. For example, the service server may accumulate points that may be used for the next service to the user, depending on the degree to which the accuracy (or reliability) of the cluster is improved according to the feedback input of the user, or depending on the degree to which the performance of the specialized model is improved according to the feedback input of the user.

Figure 11:
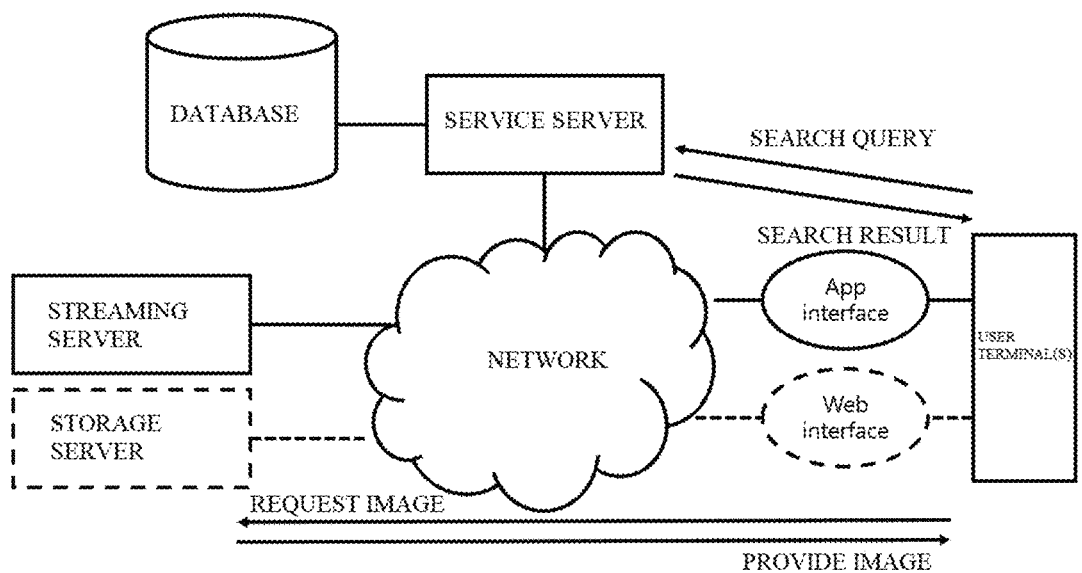
FIG. 11 is a view illustrating a search function in accordance with an exemplary embodiment.

FIG. 11 is a view illustrating a search function in accordance with an exemplary embodiment. The service server may build a database for searching a sports video. The service server may receive a search query from the user terminal. The search query may include a search target player and a search target scene. The service server may search for a URL of a sports video and time section(s) within the sports video corresponding to the search query from the database.

The service server may provide information for extracting a video clip to the streaming server, so that the video clip is directly transmitted from the streaming server to the user. The service server may provide a search result including the URL and time section(s) of the sports video to the user terminal. The user terminal may request an image of a corresponding time section of the sports video from the streaming server or the storage server based on the search result.

Although not shown in the drawing, in accordance with an exemplary embodiment, the service server may extract a video clip from a streaming server or a storage server based on {sports video access information} for the cluster including a sub-cluster (or section sequence) that has been searched for. The service server may provide the video clip to the user. The service server may cache a pre-generated video clip. The service server may store whether the video clip is cached in the database. When it is determined as a result of processing the query that the cached video clip only needs to be provided, the service server may omit the operation of extracting (or generating) the video clip and immediately provide the cached video clip to the user.

In accordance with an exemplary embodiment, an appearance feature or a motion feature may be extracted differently depending on a viewpoint of a camera for taking the sports video. Here, the viewpoint of a camera may have a value of 6 degrees of freedom (DOF) as a 3D position of the camera and a 3D orientation of the camera.

The service server may use an appearance feature or motion feature that are robust to changes in the viewpoint of the camera. For example, the service server may encode an appearance feature so that information included in a multidimensional appearance vector is independent without depending on the viewpoint of the camera. The appearance feature independent of the viewpoint of the camera may include a player's own style feature, such as hair style, skin style (or skin type) and/or tattoo style, a style feature of the object worn by the player, such as a jersey style, basketball shoe style, and/or other accessory style, and/or a physical feature of the player, such as a height or a physique of the player normalized based on a reference object.

The player's own style feature and the feature of the object worn by the player may be defined in a form independent of the viewpoint of the camera. The reference object is an object including a standardized appearance in a corresponding sports game, and may include, for example, a goal post or lines drawn on or a field or pitch. The physical feature such as the height or physique of a player may be normalized based on the size of the reference object captured on the sports video. Since the size of the reference object is standardized in a corresponding sports game, the physical feature normalized based on the reference object may be independent without depending on the viewpoint of the camera.

In addition, the service server may encode a motion feature so that information included in a multidimensional motion vector is independent without depending on the viewpoint of the camera. The motion feature independent of the viewpoint of the camera may include a normalized motion (e.g., direction, size, speed, or the like) or pose with respect to the reference object. When joints of the player are recognizable, the motion feature may include a normalized motion or a pose for each major joint. Here, major joints used for the motion feature may be defined for each motion type.

In accordance with an exemplary embodiment, the sports video may be taken with a part of the field or pitch cut off. The service server may estimate the motion of the player in the uncaptured cut space by utilizing the region sequence. For example, when an event that the ball passes through the rim or the ball hits the rim is detected in a state where no shot motion is detected, the service server may estimate that the shot motion has occurred in the uncaptured cut space. Furthermore, the service server may find a player who has moved to the uncaptured cut space from adjacent previous frames of a corresponding frame, and estimate that the shot motion has occurred by the player.

In accordance with an exemplary embodiment, the service server may analyze the sports video by additionally utilizing the motion of a referee, a whistle sound of the referee, a buzzer sound of a scoring system, or the like. For example, the service server may distinguish a two-point shot and a three-point shot by using the motion of the referee. Alternatively, the service server may determine whether a game is stopped at a corresponding time point by using a whistle sound, a buzzer sound, or the like.

In accordance with an exemplary embodiment, the service server may recognize a connection situation depending on the motion type. For example, the service server may recognize an assist situation in connection with the pass motion before the shot motion. Alternatively, the service server may recognize a block situation in connection with the block motion after the shot motion. The block situation may also be recognized by considering the direction of movement of the ball after the shot motion together.

Figure 12:
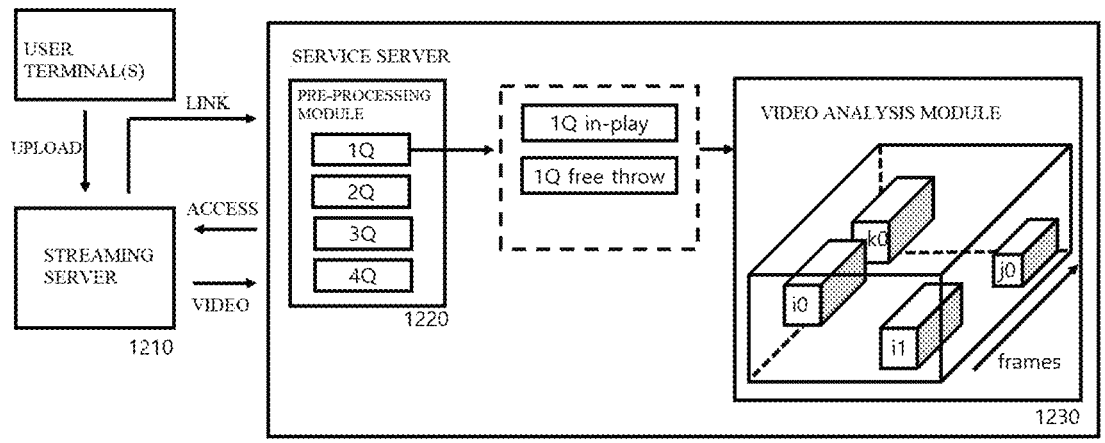
FIG. 12 is a view illustrating an operation of generating tracking clusters in accordance with an exemplary embodiment.

FIG. 12 is a view illustrating an operation of generating tracking clusters in accordance with an exemplary embodiment. Referring to FIG. 12, a user may upload a sports video to the streaming server 1210. The user may provide a link of the streaming server to the service server. As described above, the sports video may be uploaded to the storage server other than the streaming server 1210 or may be directly uploaded to the service server.

The service server may receive the sports video by accessing the streaming server 1210 using the link. In accordance with an exemplary embodiment, the service server may process the sports video while streaming it or process the sports video after downloading it.

A pre-processing module 1220 of the service server may pre-process the sports video. For example, the service server may extract an image of the game time, excluding the break time, from the sports video. When the sports game consists of four quarters, the service server may extract the game images of the first to fourth quarters. In addition, the service server may extract game progress images excluding game non-progress images from the game images. For example, even within a quarter, the game may be stopped due to a foul or timeout. The service server may extract the game progress images where the game is in progress, except for the game non-progress images where the game is stopped. The game progress images may be subdivided according to the rules of the sports game. For example, to a player who is fouled, a free throw may be awarded in a basketball game, or a free kick may be awarded in a soccer game. The service server may extract a free throw image or a free kick image according to the rules of a corresponding sports game.

The service server may extract the image by extracting a frame section or time section within the sports video. Pre-processing of the sports video may be operated in an automatic mode in which automatic processing is performed, a semi-automatic mode in which user feedback is received after being automatically processed, or a manual mode in which input from the user is received. For example, the service server may receive a start time and an end time of first to fourth quarters from the user. Alternatively, the service server may automatically extract start scene candidates and end scene candidates of the first to fourth quarters through video analysis, and receive the user's selection of the actual start scene and the actual end scene of each quarter. In addition, the service server may recognize a game stop situation due to a foul by analyzing the whistle sound of the referee or the motion of the referee. Of course, the service server may recognize the game stop situation through video analysis. For example, there may be a difference between the amount of motion of the players during a game and the amount of motion of the players in the game stop situation. The service server may recognize the game stop situation by acquiring the amount of motion of the players through video analysis.

The service server may detect and track unidentified players in the pre-processed video (1230). The service server may generate tracking clusters i0, i1, j0, and k0 by tracking regions corresponding to unidentified players from the sports video. The sports video may include a plurality of frames, and the tracking cluster may include regions of the same unidentified player included in successive frames of at least some of the plurality of frames.

The service server may assign unique identifiers to the tracking clusters i0, i1, j0, and k0. For example, the service server may assign identifiers to the tracking clusters with a combination of a start frame and a unique number. When there is a tracking cluster starting in the i-th frame, an identifier of i0 may be assigned to the tracking cluster. When there is another tracking cluster starting in the i-th frame, an identifier of i1 may be assigned to the other tracking cluster. Similarly, an identifier of j0 may be assigned to a tracking cluster starting from a j-th frame, and an identifier of k0 may be assigned to a tracking cluster starting from a k-th frame.

In addition, the service server may add, to the identifier, information indicating the end frame of the tracking cluster or the number of frames of the tracking cluster. As will be described below, when matching between tracking clusters is performed, matching may be omitted when even some frames overlap. The service server may easily determine whether the tracking clusters overlap each other by using the end frame added to the identifier or the number of frames.

When the sports video is processed in the streaming method, the service server may add, to the identifier, information indicating whether a tracking cluster is still valid in the current frame.

Figure 13:
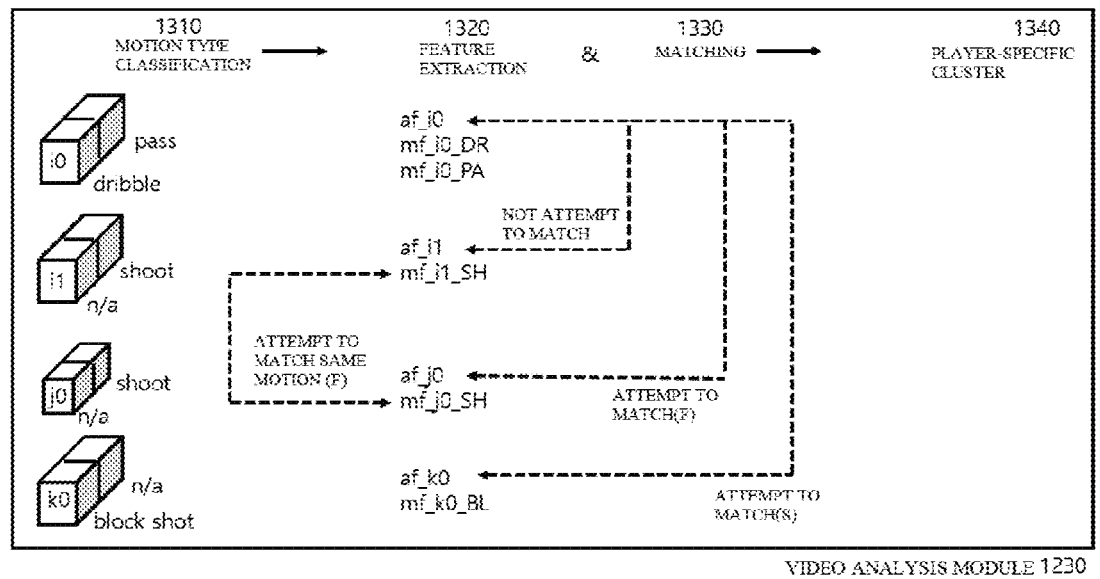
FIG. 13 is a view illustrating an operation of matching tracking clusters in accordance with an exemplary embodiment.

In the process of tracking unidentified players in the sports video, tracking of unidentified players may be interrupted due to various factors. For example, depending on the viewpoint of the camera, unidentified players may overlap each other. Alternatively, an unidentified player may deviate from the viewpoint of the camera. Alternatively, a part or all of the screen may be blocked due to an obstacle while taking the sports video. Alternatively, for other technical reasons, the tracking module may miss an unidentified player while tracking. In this case, a first tracking cluster until the tracking is interrupted may be generated, and a second tracking cluster newly tracked after the tracking is interrupted may be generated. In FIG. 13 below, an exemplary embodiment of merging tracking clusters that have been separately generated corresponding to the same unidentified player through matching will be described.

FIG. 13 is a view illustrating an operation of matching tracking clusters in accordance with an exemplary embodiment. Referring to FIG. 13, the service server may classify motion types for each tracking cluster (1310) and extract a feature (1320). The service server may extract an appearance feature of a unidentified player included in the tracking cluster. As described above, the appearance feature may include a multidimensional feature vector independent of the viewpoint of the camera.

The service server may classify motion types of at least some sections included in the tracking cluster based on predetermined motion types. For example, the service server may detect at least some continuous regions corresponding to any one of predetermined motion types, among a plurality of regions included in the tracking cluster. As an example, referring to the tracking cluster i0, the service server may detect a dribble section and a pass section. The service server may use a neural network model that sequentially receives consecutive scenes included in the tracking cluster and outputs at least one of predetermined motion types. The service server may extract a motion feature of an unidentified player included in a corresponding section in the tracking cluster based on the motion type. As described above, the motion feature may include a multidimensional feature vector independent of the viewpoint of the camera.

When a shot section is detected, the service server may separately tag a location on a court where the unidentified player has attempted to shoot. As will be described below, the service server may detect a scoring event, and perform additional tagging regarding whether the shot attempt of the unidentified player has been successful.

In accordance with an exemplary embodiment, the service server may extract corresponding regions corresponding to a state of possession of a ball from among a plurality of regions included in the tracking cluster, and detect at least some continuous regions corresponding to any one of pre-determined motion types, among the extracted regions.

In the exemplary embodiment of FIG. 13, the service server may extract an appearance feature af_i0 from the tracking cluster i0. The service server may extract a motion feature mf_i0_dribble from the dribble section included in the tracking cluster i0 and extract a motion feature mf_i0_pass from the pass section. In substantially the same manner, the service server may extract an appearance feature af_i1 from the tracking cluster i1 and extract a motion feature mf_i1_shoot. In addition, the service server may extract a appearance feature af_j0 and the motion feature mf_j0_shoot from the tracking cluster j0, and extract an appearance feature af_k0 and a motion feature mf_k0_block from a tracking cluster k0.

The service server may match the tracking clusters based on at least one of the appearance feature and the motion feature (1330). The service server may not perform matching between tracking clusters with frame sections that are at least partially overlapped. This is because different tracking clusters with overlapped frame sections may be regarded as different unidentified players. Accordingly, the service server may omit matching between the tracking cluster i0 and the tracking cluster i1. The service server may match the external feature of the tracking cluster i0 with the external feature of the tracking cluster j0 and then determine that the matching has failed. The service server may match the external feature of the tracking cluster i0 with the external feature of the tracking cluster k0 and then determine that the matching has been successful. When the matching succeeds, the service server may merge the tracking cluster i0 and the tracking cluster k0. Here, merging may be understood as an operation of including the tracking cluster i0 and the tracking cluster k0 into an unidentified player-specific cluster for the same unidentified player.

In addition, the service server may match motion features of the same motion type among tracking clusters with frame sections that do not overlap with each other. For example, the service server may match mf_i1_shoot extracted from the shot section of the tracking cluster i1 with mf_j0_shoot extracted from the shot section of the tracking cluster j0 and then determine that the matching has failed.

The service server may generate unidentified player-specific clusters through the above-described matching operation. In the above exemplary embodiments, the 'cluster' refers to an unidentified player-specific cluster, and may be understood as a concept distinct from the 'tracking cluster'. The service server may generate unidentified player-specific video clips based on the clusters (1340). The matters described above with reference to FIGS. 1 to 11 may be applied to operations after the unidentified player-specific clusters are generated, and thus a more detailed description will be omitted.

Figure 14:
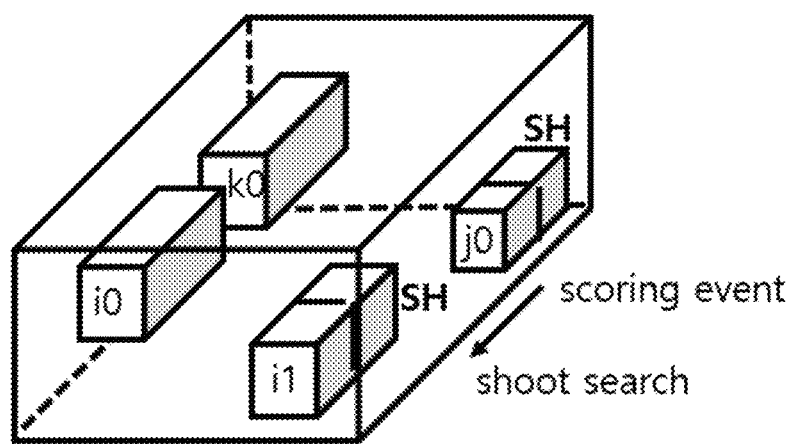
FIG. 14 is a view illustrating an operation of detecting a scoring event in accordance with an exemplary embodiment.

FIG. 14 is a view illustrating an operation of detecting a scoring event in accordance with an exemplary embodiment. Referring to FIG. 14, the service server may detect a scoring event in which the ball passes through a goalpost in a sports video. For a basketball game, it is possible to detect whether the ball passes through the rim of the basketball hoop stand. The service server may detect the goal post region or the rim region of the basketball hoop stand in the sports video, and determine whether the scoring event that the ball passes through the detected region is detected as the frame progresses.

When the scoring event is detected, the service server may identify a tracking cluster associated with the event from among the tracking clusters based on a corresponding frame. For example, the service server may identify a tracking cluster including a section of a motion type associated with the event in the corresponding frame and previous frames from among the tracking clusters. When the scoring event is detected, the service server may identify a tracking cluster including a shot section. The service server may identify a tracking cluster including the closest shot section in previous frames of the scoring event. The service server may tag information indicating that the attempted shot has been successful in the closed shot section.

In accordance with an exemplary embodiment, when generating the unidentified player-specific video clips, the service server may selectively acquire sub-clusters associated with the scoring event, and then, extract the video clips from the sports video based on the sub-clusters associated with the scoring event.

The above-described exemplary embodiments may be implemented as a processing device by a hardware component, a software component, and/or a combination of a hardware component and a software component. For example, the apparatus, method, and components described in the exemplary embodiments may be implemented by using one or more general purpose computers or special purpose computers, for example, like a processor, controller, arithmetic logic unit (ALU), digital signal processor, microcomputer, field programmable gate array (FPGA), programmable logic unit (PLU), microprocessor, or any other device capable of executing and responding to instructions. The processing device may execute an operating system (OS) and one or more software applications executed on the operating system. Further, the processing device may also access, store, manipulate, process, and generate data in response to execution of the software. For convenience of understanding, in some cases, one processing device is described as being used, but it will be apparent to those skilled in the art that the processing device includes a plurality of processing elements and/or a plurality of types of processing elements. For example, the processing device may include a plurality of processors or one processor and one controller. Other processing configurations are also possible, such as parallel processors.

Software may include a computer program, code, instructions, or one or more combinations thereof, for independently or collectively instructing or configuring the processing device to operate as desired. Software and/or data may be permanently or temporarily embodied in any type of machine, component, physical or virtual equipment, computer storage medium or device, or in a propagated signal wave in order to be interpreted by the processing device or provide instructions or data to the processing device. Software may be distributed over network coupled computer systems so that the software is stored and executed in a distributed manner. Software and data may be stored in one or more computer-readable recording media.

The methods in accordance with exemplary embodiments may be implemented in the form of program instructions that may be executed by various computer means and recorded in a computer-readable medium. The computer-readable medium may include program instructions, a data file, a data structure, or the like alone or in combination. The program instructions recorded on the medium may be specially designed and configured for the exemplary embodiments, or may be known and available to those skilled in the art of computer software. Examples of the computer-readable recording medium include magnetic media such as hard disks, floppy disks, and magnetic tapes, optical media such as CD-ROMs and DVDs, magneto-optical media such as floptical disks, a hardware device specially configured to store and execute program instructions, such as ROM, RAM, flash memory, or the like. Examples of the program instruction includes not only machine language codes such as those produced by a compiler, but also high-level language codes that can be executed by a computer using an interpreter or the like. The hardware device may be configured to operate as one or more software modules to perform operations of exemplary embodiments, and vice versa.

Although the exemplary embodiments have been described with reference to the limited drawings as described above, those skilled in the art may apply various technical modifications and variations based on the above. For example, even if the described techniques are performed in an order different from the described method, and/or the components of the described system, structure, apparatus, circuit, or the like are coupled or combined in a different form from the described manner, or supplemented or substituted by other components or equivalents, suitable results may be achieved.

What is claimed is:

1. A method of operating a video analysis server, the method comprising:
   receiving information for access to a sports video of a ball game;
   obtaining the sports video based on the received information;
   performing pre-processing of leaving dynamic pixels by filtering out static pixels from a plurality of frames included in the sports video;
   tracking a ball in the sports video from the pre-processed video;
   detecting a score-related scene of the sports video from the pre-processed video;
   determining, in response to detecting the score-related scene, an unidentified player associated with the score-related scene by using a result of tracking the ball;
   identifying the unidentified player by tracking the unidentified player up to an adjacent frame where the unidentified player is identifiable; and
   outputting, corresponding to the score-related scene, a time section of the sports video and identification information for the unidentified player,
   wherein the performing of the pre-processing comprises at least one of:
   filtering out the static pixels based on a change in pixel values between adjacent frames of a predetermined range when the sports video is a video taken from a fixed viewpoint; and
   filtering out the static pixels based on statistical values of optical flow of in-frame pixels when the sports video is a video taken from a moving viewpoint.

2. The method of claim 1, wherein the tracking of the ball comprises detecting, for each of the frames, the ball based on dynamic pixels of a corresponding frame.

3. The method of claim 1, wherein the detecting of the score-related scene comprises:
   detecting, for each of the frames, a rim based on dynamic pixels of a corresponding frame; and
   determining frames adjacent to the frame in which the rim is detected as the score-related scene.

4. The method of claim 1, wherein the determining of the unidentified player associated with the score-related scene comprises:
   detecting dynamic pixels related to a player attempting to score in frames included in the score-related scene by using the result of tracking the ball; and
   determining the unidentified player associated with the score-related scene by instance segmenting a frame in which the dynamic pixels related to the player attempting to score are detected.

5. The method of claim 1, wherein the identifying of the unidentified player comprises:
   extracting a feature from the determined unidentified player;
   comparing the extracted feature with features of previously registered players;
   determining whether or not the unidentified player is identifiable from a result of the comparing; and
   tracking the unidentified player by instance segmenting adjacent frames in response to determining that the unidentified player is not identifiable.

6. A non-transitory computer-readable recording medium that has a program for executing the method of claim 1 recorded therein.

\* \* \* \* \*